US012804314B2

(12) United States Patent

Zheng et al.

(10) Patent No.: US 12,804,314 B2

(45) Date of Patent: Nov. 17, 2026

(54) SOUND SOURCE LOCALIZATION METHOD, ELECTRONIC DEVICE AND COMPUTER-READABLE STORAGE MEDIUM

(71) Applicant: UBTECH ROBOTICS CORP LTD, Shenzhen (CN)

(72) Inventors: Zehong Zheng, Shenzhen (CN); Dongyan Huang, Shenzhen (CN); Xianjie Yang, Shenzhen (CN); Wan Ding, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 190 days.

(21) Appl. No.: 18/911,197

(22) Filed: Oct. 9, 2024

(65) Prior Publication Data

US 2025/0133337 A1 Apr. 24, 2025

(30) Foreign Application Priority Data

Oct. 18, 2023 (CN) ......................... 202311350678.8

(51) Int. Cl.
*H04R 1/40* (2006.01)
*H04R 29/00* (2006.01)

(52) U.S. Cl.
CPC ........... *H04R 1/406* (2013.01); *H04R 29/004* (2013.01); *H04R 2430/20* (2013.01); *H04R 2430/21* (2013.01); *H04R 2430/23* (2013.01)

(58) Field of Classification Search
CPC .. H04R 1/406; H04R 29/004; H04R 2430/20; H04R 2430/21; H04R 2430/23
USPC ........................................................... 381/92
See application file for complete search history.

(56) References Cited

U.S. PATENT DOCUMENTS

2004/0032796 A1* 2/2004 Chu ....................... H04R 3/005 348/E7.079

* cited by examiner

*Primary Examiner* — Vivian C Chin
*Assistant Examiner* — Douglas J Suthers

(57) ABSTRACT

A sound source localization method includes: obtaining a first audio frame and at least two second audio frames, wherein the first audio frame and the at least two second audio frames are synchronously sampled, the first audio frame is obtained by processing sound signals collected by the first microphone, the at least two second audio frames are obtained by processing sound signals collected by the second microphones; calculating a time delay estimation between the first audio frame and each of the at least two second audio frames; and determining a sound source orientation corresponding to the first audio frame and the at least two second audio frames through a preset time delay-orientation lookup table according to the time delay estimation between the first audio frame and each of the at least two second audio frames.

20 Claims, 5 Drawing Sheets

| Orientations | Time Delay Combinations |
|---|---|
| $a_n$ | $P_n\{p_{n1}, p_{n2}, p_{n3}, \ldots, p_{nm}\}$ |
| ...... | ...... |

| Orientations | Time Delay Combinations |
| --- | --- |
| $a_n$ | $P_n\{p_{n1}, p_{n2}, p_{n3}, \ldots, p_{nm}\}$ |
| …… | …… |

FIG. 3

SOUND SOURCE LOCALIZATION METHOD, ELECTRONIC DEVICE AND COMPUTER-READABLE STORAGE MEDIUM

CROSS REFERENCE TO RELATED APPLICATIONS

This application claims priority to Chinese Patent Application No. CN 202311350678.8, filed Oct. 18, 2023, which is hereby incorporated by reference herein as if set forth in its entirety.

TECHNICAL FIELD

The present disclosure generally relates to audio processing, and in particular relates to a sound source localization method, electronic device and computer-readable storage medium.

BACKGROUND

Sound source localization refers to the use of a microphone array for high-precision sound pickup, combined with the spatial relationship between the sound source and the array structure, to obtain the location information of one or more sound sources. Currently, common methods include Time Delay of Arrival (TDOA)-based localization, high-resolution spectral estimation-based localization, maximum output power-based adaptive beamforming technology, and deep learning-based localization algorithms.

However, when directly applying the above localization algorithms for sound source localization, there is still considerable computational time and complexity; that is, the real-time performance of current sound source localization still needs improvement.

Therefore, there is a need to provide a sound source localization method to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 3 is a schematic diagram of a time delay-orientation lookup table according to one embodiment.

DETAILED DESCRIPTION

Figure 1:
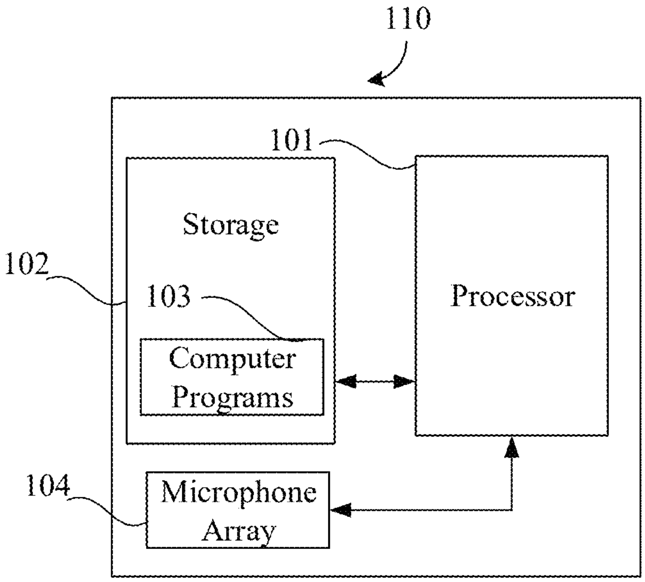
FIG. 1 is a schematic block diagram of an electronic device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 2:
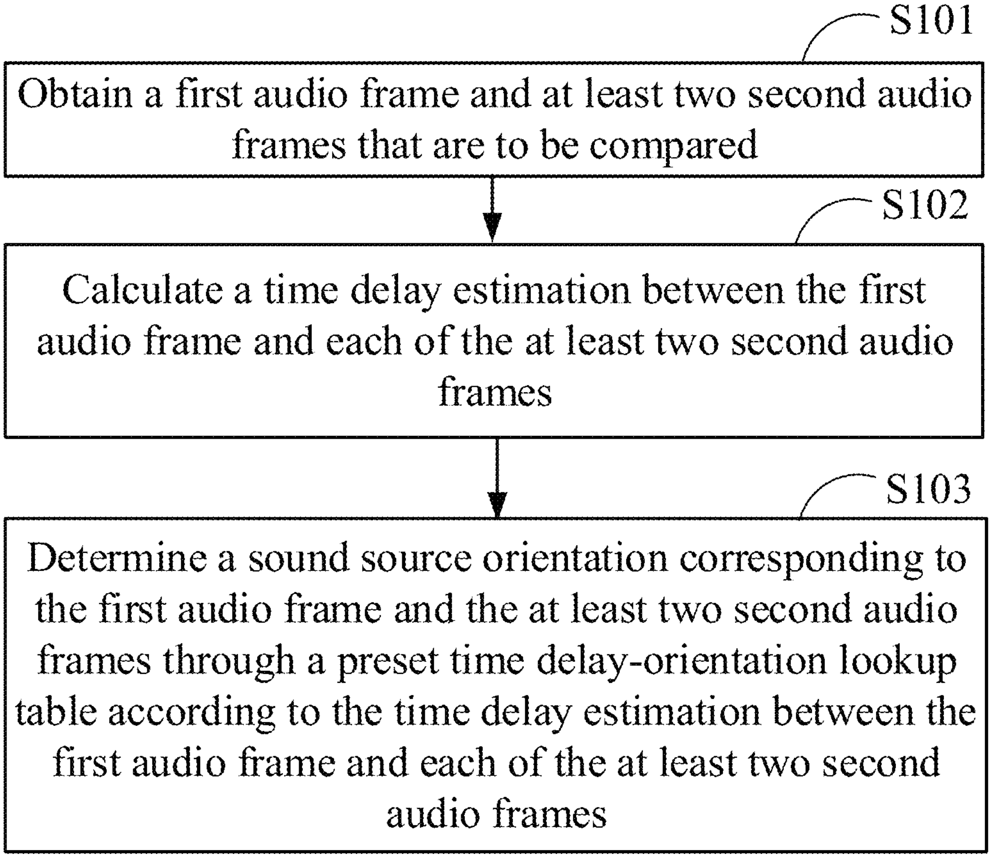
FIG. 2 is an exemplary flowchart of a sound source localization method according to one embodiment.

FIG. 1 shows a schematic block diagram of an electronic device 110 according to one embodiment. The electronic device 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a sound source localization method, such as steps S101 to S103 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the electronic device 110, such as a hard disk or a memory. The storage 102 may also be an external storage device of the electronic device 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the electronic device 110. The storage 102 can also be used to temporarily store data that have been output or is about to be output.

Figure 5:
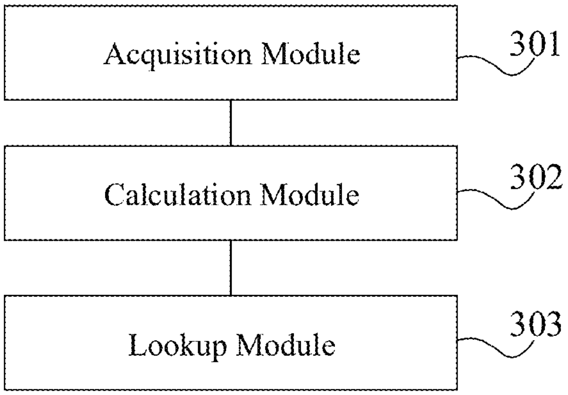
FIG. 5 is a schematic block diagram of a sound source localization device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the electronic device 110. For example, the one or more computer programs 103 may be divided into an acquisition module 301, a calculation module 302 and lookup module 303 as shown in FIG. 5.

In one embodiment, the electronic device further includes a microphone array 104 that includes a first microphone and a number of second microphones that are different from the first microphone. In the embodiment, the first microphone is a reference microphone, and the second microphones are microphones in the microphone array 104 other than the first microphone.

It should be noted that the block diagram shown in FIG. 1 is only an example of the electronic device 110. The electronic device 110 may include more or fewer components than what is shown in FIG. 1, or have a different configuration than what is shown in FIG. 1. Each component shown in FIG. 1 may be implemented in hardware, software, or a combination thereof.

FIG. 2 is an exemplary flowchart of a sound source localization method according to one embodiment. This method is based on TDOA and can be applied to electronic devices integrated with a microphone array. Alternatively, this method can be applied to other devices that are in communication with the electronic device and capable of controlling it. As an example, but not a limitation, the method can be implemented by the electronic device 110. The method may include the following steps.

Step S101: Obtain a first audio frame and at least two second audio frames that are to be compared.

After the electronic device 110 is powered on, each microphone in its microphone array can start sampling to obtain real-time audio signals. Assuming the microphone array has M microphones, the electronic device can obtain the real-time sampled audio signals from these M microphones, i.e., a total of M audio channels. The electronic device can perform synchronous preprocessing on each audio channel. Specifically, the preprocessing includes but is not limited to: stream processing and smoothing processing.

In one embodiment, the specific implementation process of preprocessing each audio signal can be as follows:

First, perform framing processing on the audio signal. As an example, the duration of each frame after framing can be 10 milliseconds; and at a sampling frequency of 16 kHz, each frame after framing has 160 sampling points. It can be understood that this process corresponds to stream processing, which allows the audio signal to be segmented into small streaming segments.

Next, perform frame overlapping on the framing result. As an example, for all frames except the first one, the last 96 sampling points of the previous frame are overlapped with each subsequent frame. It can be understood that this process corresponds to smoothing processing, allowing continuity between adjacent frames.

Finally, apply a window function to the overlapped frames. As an example, the window applied can be a mixed flat-top Hann window with a window length k of 256. It can be understood that this process also corresponds to smoothing processing, reducing spectral leakage.

Through preprocessing operations, each audio signal can be divided into multiple audio frames. For ease of description, the audio frames can be denoted as $w_{mt}$, where m represents the microphone number and t represents the frame number, both of which can be numbered starting from 0, and $w_{mt}$ represents the t-th audio frame of the m-th microphone. It can be understood that for each microphone, the sampling time corresponding to its t-th audio frame is synchronized, corresponding to the audio signal within the same time period.

Considering that the sound source localization method proposed in the present disclosure is implemented based on TDOA, it needs to pre-designate a reference microphone in the microphone array for calculating the time delay. In one embodiment, for clarity, the reference microphone is denoted as the first microphone $R_0$, and the other microphones in the array are denoted as the second microphones $R_m$ (m=1, 2, . . . , M−1), where M is the total number of microphones in the array. Thus, for ease of subsequent description, the t-th audio frame obtained by the first microphone is referred to as the first audio frame, and the t-th audio frames obtained by each of the second microphones are referred to as the second audio frames.

Step S102: Calculate a time delay estimation between the first audio frame and each of the at least two second audio frames.

The electronic device 110 can use a generalized cross correlation function (GCC) to calculate the time delay estimate; or, it can use cepstrum analysis to calculate the time delay estimate. Considering that GCC can reduce the impact of noise and reverberation in real environments, GCC is used here as an example to explain the specific process of calculating the time delay estimation between the first audio frame and each of the second audio frames (m=1, 2, . . . , M−1):

First, perform a K-point Fast Fourier Transform (FFT) on $w_{0t}$ and $w_{mt}$ respectively to obtain $W_{0t}$ and $W_{mt}$. Here, K is calculated using the equation $K=2^{\lceil log_2(2k) \rceil}$, and k is the window length described earlier.

Then, take the conjugate transpose of $W_{mt}$ to obtain $W_{mt}'$, perform element-wise multiplication between $W_{mt}'$ and $W_{0t}$, and then perform an inverse Fourier transform to obtain the cross-correlation function Q.

Finally, search for the position $Q_{index}$ of the peak $Q_{max}$ in the cross-correlation function Q. If $Q_{index}<k$, the lag coefficient p is determined to be $Q_{index}$; otherwise, p is determined to be $Q_{index}-K+1$. When p>0, it indicates that the first audio frame $w_{0t}$ lags behind the second audio frame $w_{mt}$; when p<0, it indicates that the first audio frame $w_{0t}$ precedes the second audio frame $w_{mt}$; when p=0, it indicates that the first and second audio frames are synchronized with no delay. This lag coefficient p is the time delay estimation between the first audio frame $w_{0t}$ and a given second audio frame.

It can be understood that since there is more than one second audio frame and the electronic device calculates the time delay estimation between the first audio frame and each second audio frame, multiple time delay estimation results can be obtained. For example, in the case where the microphone array contains four microphones: R0, R1, R2, and R3, the electronic device, based on the t-th audio frame obtained from each microphone, can ultimately obtain three time delay estimations: the time delay estimation between the first audio frame $w_{0t}$ and the second audio frame $w_{1t}$, the time delay estimation between the first audio frame $w_{0t}$ and the second audio frame $w_{2t}$, and the time delay estimation between the first audio frame $w_{0t}$ and the second audio frame $w_{3t}$.

Step S103: Determine a sound source orientation corresponding to the first audio frame and the at least two second audio frames through a preset time delay-orientation lookup table according to the time delay estimation between the first audio frame and each of the at least two second audio frames.

The current TDOA-based sound source localization method involves obtaining the time differences of arrival (TDOA) of the sound source to each array element and then combining the spatial relationship between the sound source and the array structure to model and calculate the corresponding sound source orientation. However, to reduce processing time and improve the real-time performance of sound source localization, the present disclosure considers shortening the computational time and complexity through pre-modeling. The process is briefly described as follows: pre-calculate the time delay combinations corresponding to various possible sound source orientations, and construct a time delay-orientation lookup table (See FIG. 3), allowing the subsequent sound source orientation to be quickly obtained by simply looking up the table. The time delay combinations store the time delay information of each second microphone relative to the first microphone. In the time delay-orientation lookup table shown in FIG. 3, $a_n$ represents the orientation of the sound source $s_n$, $p_{nm}$ represents the time delay information between the array element $R_0$ and $R_m$ ($m=1, 2, \ldots, M-1$) when the microphone array receives the audio signal of the sound source $s_n$.

The electronic device 110 has now obtained the time delay estimation between the first audio frame and each second audio frame through step 102. Combining these time delay estimations results in the time delay combinations to be searched. The electronic device can traverse the stored time delay combinations in the time delay-orientation lookup table to determine whether the time delay combination to be searched exists. If it exists, the orientation corresponding to the time delay combination to be searched in the time delay-orientation lookup table can be determined as the sound source orientation of the t-th audio frames (i.e., t-th audio frames of the first audio frame and the second audio frames). On the contrary, if it does not exist, the sound source orientation of the t-th audio frame (i.e., t-th audio frames of the first audio frame and the second audio frames) can be determined to be "None."

In one embodiment, to improve the accuracy of sound source localization, the process of constructing the time delay-orientation lookup table can specifically be as follows:

Step A1: Construct a number of virtual sound source points based on preset angle intervals and preset distance intervals in a microphone array coordinate system.

The electronic device can take the center of the microphone array as the origin and construct the microphone array coordinate system. In this system, the axis perpendicular to the plane of the microphone array is the z-axis, with the positive half-axis pointing above the array. On the plane of the microphone array, the axis pointing toward the 0° direction is the y-axis, with the positive half-axis facing directly in front of the user. The axis pointing toward the 90° direction on the same plane is the positive half of the x-axis, and the axis pointing toward the −90° direction is the negative half of the x-axis. In this microphone array coordinate system, the electronic device can determine the coordinates of each element in the microphone array, which are $R_0(X_0,Y_0,Z_0)$, $R_1(X_1,Y_1,Z_1)$, . . . , $R_m(X_m,Y_m,Z_m)$, where m corresponds to the element number, $m=0, 1, \ldots, M-1$, and M is the total number of elements (i.e., the total number of microphones in the array).

Based on this microphone array coordinate system, the electronic device can construct virtual sound source points. Since the microphone array is arranged horizontally, it is insensitive to the z-axis direction. If two sound source points are symmetric about the x-y plane, the distance from the sound source to each microphone will be the same, making it impossible to measure the elevation angle. Therefore, when constructing virtual sound source points, there is no need to make too many assumptions about the elevation angle; a reasonable fixed value (e.g., 0) can be chosen based on the actual application scenario. As a result, the electronic device can construct n virtual sound source points based on preset angular intervals and preset distance intervals. That is, for a given elevation angle, a virtual sound source point is constructed every time the angular interval is met within a preset azimuth angle range, and every time the distance interval is met within the preset distance range from the origin. For ease of explanation, any virtual sound source point can be denoted as $S_n\{a_n, e_n, d_n\}$, where $a_n$ is the azimuth angle, $e_n$ is the elevation angle, and $d_n$ is the distance from the virtual sound source point to the origin.

Taking a preset azimuth angle range of −70° to 70°, a fixed elevation angle of 0, a distance range of 0.1 meters to 0.5 meters, an angular interval of 1°, and a distance interval of 0.1 meters as an example, reference can be made to FIG. 3. FIG. 3 shows an example of the positions of the virtual sound source points constructed. In the figure, R, A, B, and C each represent a microphone in the microphone array.

It can be understood that for each virtual sound source point that has been constructed, its azimuth, elevation angle and distance to the origin are all known values. To facilitate subsequent calculations, the electronic device can convert each virtual sound source point into the microphone array coordinate system, i.e., convert $S_n\{a_n,e_n,d_n\}$ into $s_n\{x_n,y_n,z_n\}$. This conversion process can be represented by the following equations: $x_n=\sin(a_n)\times\cos(e_n)\times d_n$; $y_n=-\cos(a_n)\times\cos(e_n)\times d_n$; $z_n=\sin(e_n)\times d_n$.

Step A2: For each virtual sound source point of the virtual sound source points, calculate a time delay combination corresponding to the virtual sound source point according to speed of sound, a distance from the virtual sound source point to each microphone of the microphone array and a sampling frequency of the microphone array, wherein the time delay combination is to store time delay information of each of the second microphones relative to the first microphone.

To calculate the time delay of the sound signal from a virtual sound source point to any two elements, the electronic device needs to know the following parameters: the speed of sound, the distance from the virtual sound source point to each microphone in the microphone array, and the sampling frequency of the microphone array.

Specifically, for the speed of sound, it is usually a fixed value related to the current ambient temperature, which can be represented by the following equation: $C=33100+60\times T$ (cm/s), where T represents the current ambient temperature, and C represents the speed of sound.

Specifically, the distance from the virtual sound source point to each microphone in the microphone array can be calculated based on the coordinates $s_n\{x_n,y_n,z_n\}$ of the constructed virtual sound source points in the microphone array coordinate system. This can be expressed by the following equation: $L_{nm}=\sqrt{(x_n-X_m)^2+(y_n-Y_m)^2+(z_n-Z_m)^2}$, where $L_{nm}$ represents the distance from virtual sound source point $s_n$ to microphone element $R_m$. Other parameters have been explained earlier and will not be repeated here Specifically, the sampling rate of the microphone array is a fixed value, which is an attribute of the microphone array. Based on this sampling rate, the electronic device can determine the localization resolution of the microphone array, where the sampling rate is positively correlated with the localization accuracy. For example, with a sampling rate of 16 kHz for the microphone array, the localization resolution is approximately 2 cm per point. That is, if there is a shift of 1 sample point between two received signals, the time delay between these two received signals is approximately 1/16000 seconds, and based on the speed of sound, the difference in the signal propagation distance between these two received signals is approximately 2 cm.

Thus, the electronic device can express the time delay by the number of shifted sampling points. Let the number of shifted sampling points for the virtual sound source point $s_n$ to microphone elements $R_0$ and $R_m$ (where m=1, 2, . . . , M−1) be denoted as $p_{nm}$. This number of shifted sampling points can be calculated using the following equation:

$$p_{nm} = \text{round}\left(\frac{L_{no} - L_{nm}}{c} \times F\right) \quad (m = 1, 2, \cdots, M-1),$$

where round (•) refers to rounding to the nearest integer.

Through the above process, for each virtual sound source point, the electronic device can obtain M−1 shifted sampling points. Since the number of shifted sampling points can be used to express the time delay, the combination of these M−1 shifted sampling points forms the time delay combination.

As an example, in the case where the microphone array contains four microphones, each virtual sound source point can produce a time delay combination in the form of $P_n\{p_{n1}, p_{n2}, p_{n3}\}$.

Step A3: Construct the time delay-orientation lookup table according to an orientation and the time delay combination corresponding to each virtual sound source point.

Since the azimuth angle of each virtual sound source point is known, the electronic device can associate the orientation and time delay combination for each virtual sound source point. This association is then stored in a table, thereby constructing the time delay-orientation lookup table.

In one embodiment, multiple virtual sound source points may correspond to the same time delay combination. For example, for virtual sound source points such as (−2°, 0°, 20 cm), (−1°, 0°, 20 cm), (0°, 0°, 20 cm), (1°, 0°, 20 cm), (−2°, 0°, 30 cm), (−1°, 0°, 30 cm), (0°, 0°, 30 cm), (−2°, 0°, 40 cm), (−1°, 0°, 40 cm), and (−2°, 0°, 50 cm), the corresponding time delay combinations might all be (0, 1, 1). In such cases, the electronic device can perform statistical analysis on virtual sound source points with the same time delay combination and determine the orientation corresponding to that time delay combination by using the median of their azimuth angles. This time delay combination and its corresponding orientation are then stored in the time delay-orientation lookup table.

In some embodiments, considering that the electronic device typically processes an entire sentence spoken by the user, it is necessary for the electronic device to perform source localization not only for each audio frame but also for the complete audio sentence. Therefore, after step 103, the source localization method may further include the following steps.

Step B1: Determine a sound source orientation set corresponding to an audio frame group that is to form a complete sentence audio, wherein the audio frame group includes at least two consecutive audio frames obtained based on a single microphone.

For each microphone, the electronic device can determine whether the audio frames obtained from that microphone are mute frames by using voice activity detection and frame energy detection. Specifically, if the voice activity detection determines that the audio frames are non-speech frames and/or if the time-domain energy of the audio frames is less than a preset energy threshold, then the audio frames are considered silent frames; otherwise, the audio frames are considered speech frames.

To determine whether a sentence has ended, the electronic device can set up two corresponding counters $C_{Sil}$ and $C_{Spk}$ for each microphone, with both counters initially set to 0. Additionally, for each microphone, an array $A_{Spk}$ can be set up, which is initially empty. Here, $C_{Sil}$ is to count the number of mute frames obtained from the microphone, $C_{Spk}$ is to count the number of speech frames obtained from the microphone, and $A_{Spk}$ is to record the set of sound source orientations corresponding to the audio frame group that constitutes the complete sentence audio.

For each microphone, the electronic device performs mute detection on each audio frame sequentially and updates counters $C_{Sil}$ and $C_{Spk}$ based on the result of each mute detection. Additionally, the array $A_{Spk}$ can be updated as follows: If the current audio frame is determined to be a speech frame, $C_{Spk}$ is incremented and $C_{Sil}$ is reset to zero. If the sound source orientation of this audio frame is not "None," it is stored in the array $A_{Spk}$. If the current audio frame is a mute frame, $C_{Sil}$ is incremented.

Whenever the counters $C_{Sil}$ and/or $C_{Spk}$ are updated, it will be determined whether the condition for sentence termination is met. Specifically, the sentence termination condition can be: $C_{Sil}$ reaches a first preset value, and $C_{Spk}$ exceeds a second preset value. As an example, the first preset value can be 80, and the second preset value can be 100. Therefore, the sentence termination condition can be expressed as: $C_{Sil} \geq 80$ and $C_{Spk} > 100$, which indicates whether a mute period of up to 800 milliseconds occurs during a speaking period longer than 1 second. When this sentence termination condition is met, the electronic device may consider the sentence to be finished, at which point further analysis can be conducted on the array $A_{Spk}$.

Step B2: Determine the sound source orientation corresponding to the complete sentence audio according to the sound source orientation set.

Ideally, if the user remains completely still while speaking (i.e., the mouth position remains absolutely stationary), the sound source orientation of each audio frame corresponding to a complete sentence captured by the microphones would remain consistent. However, in reality, the user is likely to perform other actions (e.g., nodding or moving around) while speaking, which results in multiple different sound source orientations being stored in the sound source orientation set. The electronic device can analyze this sound source orientation set to determine the most likely sound source orientation corresponding to the complete sentence audio.

In some embodiments, considering that users typically do not make very large movements while speaking, step B2 can include the following steps.

Step C1: Determine a sound source orientation target value according to the sound source orientation set, wherein the sound source orientation target value is a mode in the sound source orientation set.

The electronic device can perform statistical analysis on the sound source orientation set to determine the mode of the stored sound source orientations, which can then be identified as the sound source orientation target value.

Step C2: Determine whether a frequency of occurrence of the sound source orientation target value is greater than a preset value that is determined based on an amount of audio frames in the audio frame group.

To ensure that the sound source orientation target value can represent the sound source orientation of the complete audio sentence, the electronic device can perform a validity check on the sound source orientation target value. Specifically, it checks whether the occurrence frequency of the sound source orientation target value exceeds a specified value. This specified value is determined based on the number of audio frames in the audio frame group; for example, it could be 0.1 times the number of audio frames in the group, though this is not limited in the current implementation.

Step C3: In response to the frequency of occurrence of the sound source orientation target value being greater than the preset value, determine the sound source orientation of the complete sentence audio according to the sound source orientation target value.

In cases where the occurrence frequency of the sound source orientation target value exceeds the preset value, the electronic device can consider this sound source orientation target value as valid, meaning that the sound source orientation target value can represent the sound source orientation of the current complete audio sentence. Based on this, the electronic device can determine the sound source orientation of the complete audio sentence according to the sound source orientation target value.

In one embodiment, to ensure full consideration of the sound source orientation set, when the occurrence frequency of the sound source orientation target value exceeds the preset value, the electronic device can further determine whether there are any sound source orientation candidate values. A sound source orientation candidate value refers to, in addition to the sound source orientation target value, a sound source orientation in the sound source orientation set whose frequency of occurrence is greater than the preset value.

If there is a sound source orientation candidate value, it indicates that this sound source orientation candidate value also holds a certain proportion within the sound source orientation set. Therefore, the electronic device can adjust the sound source orientation target value accordingly. Specifically, the device determines a first smoothing coefficient based on the difference between the sound source orientation target value and the sound source orientation candidate value, and applies smoothing to the sound source orientation candidate value. Ultimately, the electronic device determines the result of the smoothing processing as the sound source orientation of the complete sentence audio. It is important to note that if there are more than two sound source orientation candidate values, the electronic device may perform smoothing processing on the sound source orientation target value based on each sound source orientation candidate values in descending order of occurrence frequency.

Conversely, if no sound source orientation candidate value exists, the sound source orientation target value can be determined as the sound source orientation of the complete sentence audio without applying any smoothing to the sound source orientation candidate value.

In one embodiment, to enable the electronic device to focus its processing on meaningful audio frames and achieve more targeted subsequent processing, the electronic device can apply filtering to audio frames that are not of interest. Based on this, after step 103, the sound source localization method may further include the following steps.

Step D1: For each audio frame to be processed, performing mute detection on the audio frame to be processed.

The audio frame to be processed includes the first audio frame and the second audio frames. That is, each audio frame for which the sound source location has been determined can be considered as an audio frame to be processed. As described in step B1 above, the electronic device can determine whether the audio frame obtained by the microphone is a mute frame through voice activity detection and frame energy detection, which will not be repeated here.

Step D2: Update a microphone filter coefficient corresponding to the audio frame to be processed according to a result of mute detection.

Each microphone corresponds to a filter coefficient, which is used to filter the audio frames obtained through the corresponding microphone. Each filter coefficient is initially set to 0, and the value range for each filtering coefficient is [0,1]. Specifically, the larger the filter coefficient, the louder the volume; conversely, the smaller the filter coefficient, the lower the volume.

Specifically, when the result of the mute detection indicates that the audio frame to be processed is a mute frame, the electronic device can quickly reduce the filter coefficient of the microphone corresponding to the audio frame to be processed. For example, f-f'/1.5f, where f is the filter coefficient before reduction, and f is the filter coefficient after reduction.

Specifically, when the result of the mute detection indicates that the audio frame to be processed is not a silent frame, the electronic device can adjust the filter coefficient of the microphone corresponding to the audio frame to be processed based on the smoothed sound source orientation of a processed audio frame, a sound source orientation of the audio frame to be processed and/or a frame energy of the audio frame to be processed. The adjustment process is explained as follows.

To enable the adjustment of the microphone's filter coefficient, the electronic device may be configured with the following parameters: Considering that the sound source orientation of audio frames during voiced periods might have a value of "None," the electronic device sets a corresponding counter $C_{None}$ for each microphone, which is initialized to zero. This counter is used to track the number of consecutive audio frames obtained from that microphone where the sound source orientation is "None." Specifically, when the current audio frame has a sound source orientation of "None," the counter increases by one; otherwise, the counter resets to zero.

To achieve the smoothing of the sound source orientation, the electronic device sets the following intermediate parameters for each microphone: $A_{Last}$ and $A_{Curr}$. Here, $A_{Last}$ represents the smoothed sound source orientation of the processed audio frame, and $A_{Curr}$ represents the smoothed sound source orientation of the audio frame to be processed. Both the processed audio frame and the audio frame to be processed are obtained from the same microphone, with the processed audio frame being the previous frame of the audio frame to be processed.

The first possible situation is that the number of consecutive audio frames, including the audio frame to be processed, with a sound source orientation of "None" has reached a third preset value. In other words, for a certain microphone, there have been several consecutive audio frames whose sound source orientation is None. In this case, the electronic device can reduce the filter coefficient of the microphone corresponding to the audio frame to be processed to some extent, for example, f=f'/1.1, where f' is the filter coefficient before the update, and f is the filter coefficient after the update. In addition, the electronic device can set $A_{Last}$ to "None."

The second possible situation is when the sound source orientation $a_n$ of the audio frame to be processed is a valid value (i.e., not "None"). In this case, the electronic device can first determine the smoothed sound source orientation of the audio frame to be processed. Then, based on this smoothed sound source orientation and the sound source orientation of the audio frame to be processed obtained through step 103, the filter coefficient can be jointly adjusted. The adjustment process can be expressed by the following equation:

$$f=\begin{cases} f'+0.1 & [(A_{Curr}\geq\theta_{min}-5)\ \&\&\ (A_{Curr}\leq\theta_{max}+5)]\ \&\&\ [(a_n\geq\theta_{min})\ \&\&\ (a_n\leq\theta_{max})] \\ f'/1.2 & [(A_{Curr}\geq\theta_{min}-5)\ \&\&\ (A_{Curr}\leq\theta_{max}+5)]\ \&\&\ [(a_n<\theta_{min})\ ||\ (a_n>\theta_{max})] \\ f'-0.04 & (A_{Curr}<\theta_{min}-5)\ ||\ (A_{Curr}>\theta_{max}+5) \end{cases},$$

where $\theta_{min}$ represents a preset minimum value of the desired orientation, and $\theta_{max}$ represents a preset maximum value of the desired orientation, $A_{Curr}$ is the smoothed sound source orientation of the audio frame to be processed, $a_n$ is the sound source orientation (i.e., the sound source orientation retrieved from the lookup table) of the audio frame to be processed obtained through step 103, f' is the filter coefficient before the update, and f is the filter coefficient after the update.

The smoothed sound source orientation $A_{Curr}$ of the audio frame to be processed can be determined through the following process: If the smoothed sound source orientation of the processed audio frame $A_{Last}$ is "None," the sound source orientation $a_n$ of the audio frame to be processed obtained by step 103 and the smoothed sound source orientation $A_{Last}$ of the processed audio frame can be smoothed by a second smoothing coefficient to obtain a smoothed sound source orientation $A_{Curr}$ of the audio frame to be processed. The smoothing process can be specifically expressed as follows: $A_{Curr}=\gamma\times a_n+(1-\gamma)\times A_{Last}$, where $\gamma$ is the smoothing coefficient, which is determined by the difference between $a_n$ and $A_{Last}$ and the frame energy of the audio frame to be processed, and can be specifically expressed as follows:

$$\gamma=\begin{cases} 0.005 & |a_n-A_{Last}|>5 \\ 0.02 & (|a_n-A_{Last}|\leq 5\ \&\&\ (\text{Energy}>1e8) \\ 0.008 & (|a_n-A_{Last}|\leq 5\ \&\&\ (\text{Energy}\leq 1e8) \end{cases},$$

where Energy is the frame energy of the audio frame to be processed.

Step D3: Perform filtering on the audio frame to be processed on the microphone filter coefficient.

The electronic device can limit the value of the filter coefficient based on its predefined range and then multiply the resulting filter coefficient with the audio frame to be processed to obtain the filtered audio frame. For example, if the audio frame to be processed is based on the first microphone, the filtering process can be expressed by the following equation: $w_{0t}'=w_{0t}\times\max(\min(f, 1), 0)$, where $w_{0t}'$ is the filtered audio frame, $w_{0t}$ is the audio frame to be processed, and f is the filter coefficient updated by step D2.

It should be noted that, as previously mentioned, if two sound sources are present simultaneously, the sound source localization at the same moment can only point to the one with the higher sound pressure. Based on this, if the lower sound pressure source falls within the desired range while the higher sound pressure source does not, the electronic device will filter out sound through attenuated filter coefficients.

In one embodiment, after calculating each time delay estimation, the validity of the time delay estimation needs to be verified from the following two aspects: From the perspective of numerical range, the electronic device can determine whether the following condition holds: $Q_{max}>10^7$; From the perspective of the difference between any two sides of a triangle being smaller than the third side (the difference in distances from the sound source to two array elements must be less than the distance between the two array elements), the electronic device can determine whether the following condition holds:

$$|p_{nm}|=\text{round}\left(\frac{|L_{no}-L_{nm}|}{c}\times F\right)<\left(\frac{\sqrt{(X_0-X_m)^2+(Y_0-Y_m)^2+(Z_0-Z_m)^2}}{c}\times F\right).$$

Only if both of the above criteria are met will the corresponding time delay estimation be considered valid; otherwise, the time delay estimation will be deemed invalid.

As observed, in the embodiments of the present disclosure, the electronic device stores a precomputed time delay-orientation lookup table that represents the correspondence between time delays and orientations. This way, during sound source localization, the electronic device only needs to compute the time delay estimation and then look up the result in the table to obtain the final localization result, without performing complex real-time calculations of time delays to orientations. This approach eliminates the need for training data and requires only the position coordinates of each microphone in the array to establish a three-dimensional sound source model. It enhances the real-time performance of sound source localization and facilitates the rapid adaptation of various microphone arrays for implementation in different products.

It should be understood that sequence numbers of the foregoing processes do not mean an execution sequence in the above-mentioned embodiments. The execution sequence of the processes should be determined according to functions and internal logic of the processes, and should not be construed as any limitation on the implementation processes of the above-mentioned embodiments.

Figure 4:
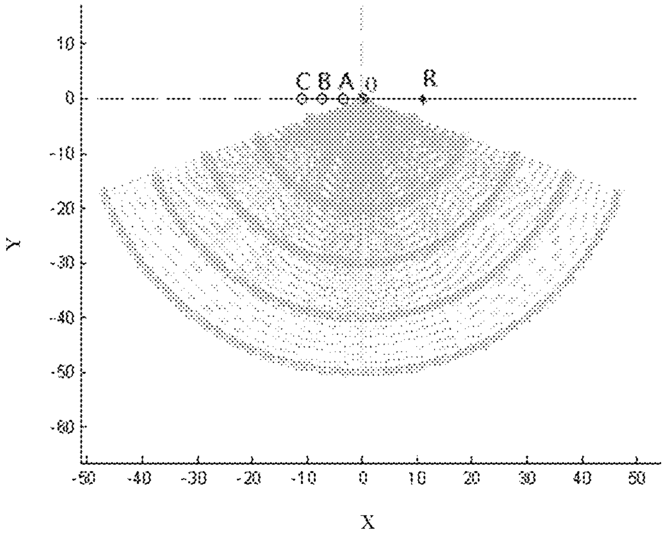
FIG. 4 is a schematic diagram showing the positions of the constructed virtual sound source points according to one embodiment.

Corresponding to the method described in the above embodiments, FIG. 4 illustrates a block diagram of a sound source localization device according to one embodiment. For the sake of clarity, only the relevant parts are shown.

In one embodiment, the device may include an acquisition module 301, a calculation module 302 and lookup module 303. The acquisition module 301 is to obtain a first audio frame and at least two second audio frames that are to be compared. The first audio frame and the at least two second audio frames are synchronously sampled. The first audio frame is obtained by processing sound signals collected by the first microphone, and the at least two second audio frames are obtained by processing sound signals collected by the second microphones. The first microphone is a reference microphone. The second microphones are other microphones in a microphone array other than the first microphone. The calculation module 302 is to calculate a time delay estimation between the first audio frame and each of the at least two second audio frames. The lookup module 303 is to determine a sound source orientation corresponding to the first audio frame and the at least two second audio frames through a preset time delay-orientation lookup table according to the time delay estimation between the first audio frame and each of the at least two second audio frames.

In one embodiment, the device further includes a construction module for constructing the time delay-orientation lookup table. The construction module may include a first construction submodule, a first calculation submodule and a second construction submodule. The first construction submodule is to construct a number of virtual sound source points based on preset angle intervals and preset distance intervals in a microphone array coordinate system. The microphone array coordinate system is created with a center of the microphone array as an origin. The first calculation submodule is to, for each virtual sound source point of the virtual sound source points, calculate a time delay combination corresponding to the virtual sound source point according to speed of sound, a distance from the virtual sound source point to each microphone of the microphone array and a sampling frequency of the microphone array. The time delay combination is to store time delay information of each of the second microphones relative to the first microphone. The second construction submodule is to construct the time delay-orientation lookup table according to an orientation and the time delay combination corresponding to each virtual sound source point.

In one embodiment, the device may further include a first determination submodule and a second determination submodule. The first determination submodule is to determine a sound source orientation set corresponding to an audio frame group that is configured to form a complete sentence audio. The audio frame group includes at least two consecutive audio frames obtained based on a single microphone. The second determination submodule is to determine the sound source orientation corresponding to the complete sentence audio according to the sound source orientation set.

In one embodiment, the second determination submodule may include a first determination unit, a judgement unit, and a second determination unit. The first determination unit is to determine a sound source orientation target value according to the sound source orientation set. The sound source orientation target value is a mode in the sound source orientation set. The judgement unit is to determine whether a frequency of occurrence of the sound source orientation target value is greater than a preset value that is determined based on an amount of audio frames in the audio frame group. The second determination unit is to, in response to the frequency of occurrence of the sound source orientation target value being greater than the preset value, determine the sound source orientation of the complete sentence audio according to the sound source orientation target value.

In one embodiment, the second determination unit may include a first determination subunit, a smoothing process subunit, and a third determination subunit. The first determination subunit is to determine whether there is a sound source orientation candidate value according to the sound source orientation set. The sound source orientation candidate value is, in addition to the sound source orientation target value, a sound source orientation in the sound source orientation set whose frequency of occurrence is greater than the preset value. The smoothing process subunit is to, in response to existence of the sound source orientation candidate value, perform a smoothing process the sound source orientation target value according to the sound source orientation candidate value. The third determination subunit is to determine the sound source orientation of the complete sentence audio according to a result of the smoothing process.

In one embodiment, the device may further include a detection submodule, an update submodule and a filter processing submodule. The detection submodule is to, for each audio frame to be processed, perform mute detection on the audio frame to be processed. The audio frame to be processed includes the first audio frame and the second audio frame. The update submodule is to update a microphone filter coefficient corresponding to the audio frame to be processed according to a result of mute detection. The filter processing submodule is to perform filtering on the audio frame to be processed on the microphone filter coefficient.

In one embodiment, the update submodule may include a first update subunit and a second update subunit. The first update subunit is to, in response to the result of mute detection indicating that the audio frame to be processed is a mute frame, reduce the microphone filter coefficient corresponding to the audio frame to be processed. The second update subunit is to, in response to the result of mute detection indicating that the audio frame to be processed is not a mute frame, adjust the microphone filter coefficient corresponding to the audio frame to be processed according to a smoothed sound source orientation of a processed audio frame, a sound source orientation of the audio frame to be processed and/or a frame energy of the audio frame to be processed. The processed audio frame is a previous audio frame obtained based on the microphone corresponding to the audio frame to be processed.

As observed, in the embodiments of the present disclosure, the device stores a precomputed time delay-orientation lookup table that represents the correspondence between time delays and orientations. This way, during sound source localization, the device only needs to compute the time delay estimation and then look up the result in the table to obtain the final localization result, without performing complex real-time calculations of time delays to orientations. This approach eliminates the need for training data and requires only the position coordinates of each microphone in the array to establish a three-dimensional sound source model. It enhances the real-time performance of sound source localization and facilitates the rapid adaptation of various microphone arrays for implementation in different products.

Each unit in the device discussed above may be a software program module, or may be implemented by different logic circuits integrated in a processor or independent physical components connected to a processor, or may be implemented by multiple distributed processors.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented sound source localization method applied to an electronic device integrated with a microphone array that comprises a first microphone and a plurality of second microphones that are different from the first microphone, the method comprising:

obtaining a first audio frame and at least two second audio frames that are to be compared, wherein the first audio frame and the at least two second audio frames are synchronously sampled, the first audio frame is obtained by processing sound signals collected by the first microphone, the at least two second audio frames are obtained by processing sound signals collected by the second microphones, and the first microphone is a reference microphone;

calculating a time delay estimation between the first audio frame and each of the at least two second audio frames; and determining a sound source orientation corresponding to the first audio frame and the at least two second audio frames through a preset time delay-orientation lookup table according to the time delay estimation between the first audio frame and each of the at least two second audio frames;

wherein the method further comprises:

determining a sound source orientation set corresponding to an audio frame group that is configured to form a complete sentence audio, wherein the audio frame group comprises at least two consecutive audio frames obtained based on a single microphone; and determining the sound source orientation corresponding to the complete sentence audio according to the sound source orientation set.

2. The method of claim 1, wherein the time delay-orientation lookup table is constructed according to the following steps:

constructing a plurality of virtual sound source points based on preset angle intervals and preset distance intervals in a microphone array coordinate system, wherein the microphone array coordinate system is created with a center of the microphone array as an origin;

for each virtual sound source point of the virtual sound source points, calculating a time delay combination corresponding to the virtual sound source point according to speed of sound, a distance from the virtual sound source point to each microphone of the microphone array and a sampling frequency of the microphone array, wherein the time delay combination is configured to store time delay information of each of the second microphones relative to the first microphone; and constructing the time delay-orientation lookup table according to an orientation and the time delay combination corresponding to each virtual sound source point.

3. The method of claim 1, wherein determining the sound source orientation corresponding to the complete sentence audio according to the sound source orientation set comprises:

determining a sound source orientation target value according to the sound source orientation set, wherein the sound source orientation target value is a mode in the sound source orientation set;

determining whether a frequency of occurrence of the sound source orientation target value is greater than a preset value that is determined based on an amount of audio frames in the audio frame group; and in response to the frequency of occurrence of the sound source orientation target value being greater than the preset value, determining the sound source orientation of the complete sentence audio according to the sound source orientation target value.

4. The method of claim 3, wherein determining the sound source orientation corresponding to the complete sentence audio according to the sound source orientation set comprises:

determining whether there is a sound source orientation candidate value according to the sound source orientation set, wherein the sound source orientation candidate value is: in addition to the sound source orientation target value, a sound source orientation in the sound source orientation set whose frequency of occurrence is greater than the preset value, in response to existence of the sound source orientation candidate value, performing a smoothing process the sound source orientation target value according to the sound source orientation candidate value; and determining the sound source orientation of the complete sentence audio according to a result of the smoothing process.

5. The method of claim 1, further comprising:

for each audio frame to be processed, performing mute detection on the audio frame to be processed, wherein the audio frame to be processed comprises the first audio frame and the at least two second audio frames;

updating a microphone filter coefficient corresponding to the audio frame to be processed according to a result of mute detection; and performing filtering on the audio frame to be processed on the microphone filter coefficient.

6. The method of claim 5, wherein updating the microphone filter coefficient corresponding to the audio frame to be processed according to a result of mute detection comprises:

in response to the result of mute detection indicating that the audio frame to be processed is a mute frame, reducing the microphone filter coefficient corresponding to the audio frame to be processed; and in response to the result of mute detection indicating that the audio frame to be processed is not a mute frame, adjusting the microphone filter coefficient corresponding to the audio frame to be processed according to a smoothed sound source orientation of a processed audio frame, a sound source orientation of the audio frame to be processed and/or a frame energy of the audio frame to be processed, wherein the processed audio frame is a previous audio frame obtained based on the microphone corresponding to the audio frame to be processed.

7. An electronic device comprising:

one or more processors; and a memory coupled to the one or more processors, the memory storing programs that, when executed by the one or more processors, cause performance of operations comprising:

obtaining a first audio frame and at least two second audio frames that are to be compared, wherein the first audio frame and the at least two second audio frames are synchronously sampled, the first audio frame is obtained by processing sound signals collected by the first microphone, the at least two second audio frames are obtained by processing sound signals collected by the second microphones, and the first microphone is a reference microphone;

calculating a time delay estimation between the first audio frame and each of the at least two second audio frames; and determining a sound source orientation corresponding to the first audio frame and the at least two second audio frames through a preset time delay-orientation lookup table according to the time delay estimation between the first audio frame and each of the at least two second audio frames;

wherein the operations further comprise:

for each audio frame to be processed, performing mute detection on the audio frame to be processed, wherein the audio frame to be processed comprises the first audio frame and the at least two second audio frames;

updating a microphone filter coefficient corresponding to the audio frame to be processed according to a result of mute detection; and performing filtering on the audio frame to be processed on the microphone filter coefficient.

8. The electronic device of claim 7, wherein the time delay-orientation lookup table is constructed according to the following steps:

constructing a plurality of virtual sound source points based on preset angle intervals and preset distance intervals in a microphone array coordinate system, wherein the microphone array coordinate system is created with a center of the microphone array as an origin;

for each virtual sound source point of the virtual sound source points, calculating a time delay combination corresponding to the virtual sound source point according to speed of sound, a distance from the virtual sound source point to each microphone of the microphone array and a sampling frequency of the microphone array, wherein the time delay combination is configured to store time delay information of each of the second microphones relative to the first microphone; and constructing the time delay-orientation lookup table according to an orientation and the time delay combination corresponding to each virtual sound source point.

9. The electronic device of claim 7, wherein the operations further comprise:

determining a sound source orientation set corresponding to an audio frame group that is configured to form a complete sentence audio, wherein the audio frame group comprises at least two consecutive audio frames obtained based on a single microphone; and determining the sound source orientation corresponding to the complete sentence audio according to the sound source orientation set.

10. The electronic device of claim 9, wherein determining the sound source orientation corresponding to the complete sentence audio according to the sound source orientation set comprises:

determining a sound source orientation target value according to the sound source orientation set, wherein the sound source orientation target value is a mode in the sound source orientation set;

determining whether a frequency of occurrence of the sound source orientation target value is greater than a preset value that is determined based on an amount of audio frames in the audio frame group; and in response to the frequency of occurrence of the sound source orientation target value being greater than the preset value, determining the sound source orientation of the complete sentence audio according to the sound source orientation target value.

11. The electronic device of claim 10, wherein determining the sound source orientation corresponding to the complete sentence audio according to the sound source orientation set comprises:

determining whether there is a sound source orientation candidate value according to the sound source orientation set, wherein the sound source orientation candidate value is: in addition to the sound source orientation target value, a sound source orientation in the sound source orientation set whose frequency of occurrence is greater than the preset value, in response to existence of the sound source orientation candidate value, performing a smoothing process the sound source orientation target value according to the sound source orientation candidate value; and determining the sound source orientation of the complete sentence audio according to a result of the smoothing process.

12. The electronic device of claim 7, wherein updating the microphone filter coefficient corresponding to the audio frame to be processed according to a result of mute detection comprises:

in response to the result of mute detection indicating that the audio frame to be processed is a mute frame, reducing the microphone filter coefficient corresponding to the audio frame to be processed; and in response to the result of mute detection indicating that the audio frame to be processed is not a mute frame, adjusting the microphone filter coefficient corresponding to the audio frame to be processed according to a smoothed sound source orientation of a processed audio frame, a sound source orientation of the audio frame to be processed and/or a frame energy of the audio frame to be processed, wherein the processed audio frame is a previous audio frame obtained based on the microphone corresponding to the audio frame to be processed.

13. A non-transitory computer-readable storage medium storing instructions that, when executed by at least one processor of an electronic device, cause the at least one processor to perform a method, the method comprising:

obtaining a first audio frame and at least two second audio frames that are to be compared, wherein the first audio frame and the at least two second audio frames are synchronously sampled, the first audio frame is obtained by processing sound signals collected by the first microphone, the at least two second audio frames are obtained by processing sound signals collected by the second microphones, and the first microphone is a reference microphone;

calculating a time delay estimation between the first audio frame and each of the at least two second audio frames; and determining a sound source orientation corresponding to the first audio frame and the at least two second audio frames through a preset time delay-orientation lookup table according to the time delay estimation between the first audio frame and each of the at least two second audio frames, wherein the preset time delay-orientation lookup table comprises a plurality of preset sound source orientations and a plurality of time delay combinations, and wherein each of the time delay combinations corresponds to one of the preset sound source orientations, and each of the time delay combinations comprises time delay information between the first audio frame and each of the at least two second audio frames.

14. The non-transitory computer-readable storage medium of claim 13, wherein the time delay-orientation lookup table is constructed according to the following steps:

constructing a plurality of virtual sound source points based on preset angle intervals and preset distance intervals in a microphone array coordinate system, wherein the microphone array coordinate system is created with a center of the microphone array as an origin;

for each virtual sound source point of the virtual sound source points, calculating a time delay combination corresponding to the virtual sound source point according to speed of sound, a distance from the virtual sound source point to each microphone of the microphone array and a sampling frequency of the microphone array, wherein the time delay combination is configured to store time delay information of each of the second microphones relative to the first microphone; and constructing the time delay-orientation lookup table according to an orientation and the time delay combination corresponding to each virtual sound source point.

15. The non-transitory computer-readable storage medium of claim 13, wherein the method further comprises:

determining a sound source orientation set corresponding to an audio frame group that is configured to form a complete sentence audio, wherein the audio frame group comprises at least two consecutive audio frames obtained based on a single microphone; and determining the sound source orientation corresponding to the complete sentence audio according to the sound source orientation set.

16. The non-transitory computer-readable storage medium of claim 15, wherein determining the sound source orientation corresponding to the complete sentence audio according to the sound source orientation set comprises:

determining a sound source orientation target value according to the sound source orientation set, wherein the sound source orientation target value is a mode in the sound source orientation set;

determining whether a frequency of occurrence of the sound source orientation target value is greater than a preset value that is determined based on an amount of audio frames in the audio frame group; and in response to the frequency of occurrence of the sound source orientation target value being greater than the preset value, determining the sound source orientation of the complete sentence audio according to the sound source orientation target value.

17. The non-transitory computer-readable storage medium of claim 16, wherein determining the sound source orientation corresponding to the complete sentence audio according to the sound source orientation set comprises:

determining whether there is a sound source orientation candidate value according to the sound source orientation set, wherein the sound source orientation candidate value is: in addition to the sound source orientation target value, a sound source orientation in the sound source orientation set whose frequency of occurrence is greater than the preset value, in response to existence of the sound source orientation candidate value, performing a smoothing process the sound source orientation target value according to the sound source orientation candidate value; and determining the sound source orientation of the complete sentence audio according to a result of the smoothing process.

18. The non-transitory computer-readable storage medium of claim 13, wherein the method further comprises:

for each audio frame to be processed, performing mute detection on the audio frame to be processed, wherein the audio frame to be processed comprises the first audio frame and the at least two second audio frames;

updating a microphone filter coefficient corresponding to the audio frame to be processed according to a result of mute detection; and performing filtering on the audio frame to be processed on the microphone filter coefficient.

19. The non-transitory computer-readable storage medium of claim 18, wherein updating the microphone filter coefficient corresponding to the audio frame to be processed according to a result of mute detection comprises:

in response to the result of mute detection indicating that the audio frame to be processed is a mute frame, reducing the microphone filter coefficient corresponding to the audio frame to be processed; and in response to the result of mute detection indicating that the audio frame to be processed is not a mute frame, adjusting the microphone filter coefficient corresponding to the audio frame to be processed according to a smoothed sound source orientation of a processed audio frame, a sound source orientation of the audio frame to be processed and/or a frame energy of the audio frame to be processed, wherein the processed audio frame is a previous audio frame obtained based on the microphone corresponding to the audio frame to be processed.

20. The non-transitory computer-readable storage medium of claim 18, wherein the microphone filter coefficient is initially set to 0, and a value range for the microphone filter coefficient is [0,1]; and wherein the microphone filter coefficient is proportional to a volume.

* * * * *